Dec. 22, 1931.   C. C. FARMER   1,837,420
FLUID PRESSURE BRAKE DEVICE
Filed Dec. 4, 1930   3 Sheets-Sheet 2

INVENTOR.
CLYDE C. FARMER
BY Wm. M. Cady
ATTORNEY.

Patented Dec. 22, 1931

1,837,420

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE DEVICE

Application filed December 4, 1930. Serial No. 500,017.

This invention relates to fluid pressure brakes, and more particularly to a fluid pressure brake equipment in which the brakes are applied by effecting a reduction in pressure in the brake pipe and are released by increasing the brake pipe pressure.

One object of my invention is to provide a fluid pressure brake apparatus in which means are provided for facilitating the release of the brakes after an emergency application of the brakes.

It has heretofore been proposed to provide an emergency valve mechanism having a normally charged quick action or volume increasing chamber and a piston subject to the opposing pressures of the brake pipe and the quick action chamber for operating valve means upon a sudden reduction in brake pipe pressure to initiate an emergency application of the brakes.

With some of the prior devices, the quick action chamber is charged from the brake pipe and in releasing the brakes, when the brake valve is turned to release position, the brake pipe may be charged on cars toward the front end of the train to a pressure in excess of the normal standard pressure carried in the system. When the brake valve is turned to running position, the brake pipe pressure subsides to the normal pressure and if any of the quick action chambers have been charged in excess of the normal pressure, while the brake valve is in release position, the corresponding emergency valve device is liable to be operated so as to initiate an emergency application of the brakes.

Another object of my invention is to prevent the overcharging of the quick action chamber when the brake pipe pressure is increased to effect the release of the brakes. This object is realized by maintaining the auxiliary reservoir of the equipment connected with the quick action chamber in the release position of the apparatus.

A more specific object of my invention is to provide a fluid pressure brake apparatus in which valve means are provided for controlling the operation of the emergency valve mechanism of the apparatus, the charging of the quick action chamber which is associated with the emergency valve mechanism, and the supplying of fluid under pressure from a supplemental reservoir to the brake pipe to facilitate the release of the brakes after a service application.

A further specific object of my invention is to provide a fluid pressure brake apparatus having an emergency valve device operative upon a sudden reduction in brake pipe pressure to connect a normally charged reservoir to the brake cylinder for augmenting auxiliary reservoir pressure to provide a high brake cylinder pressure in emergency and further operative in releasing the brakes after an emergency application to connect the brake cylinder to the brake pipe for increasing the rate of build up of pressure in the brake pipe to facilitate the release of the brakes.

Other objects and advantages will appear in the following more detailed description of the invention.

In the accompanying drawings.

The valve device shown in Figs. 1, 2, 3 and 4 comprises a triple valve portion, an emergency valve device, and a pilot valve device.

The triple valve portion comprises a casing 1 having a piston chamber 2, connected through passage 3 with the usual brake pipe 4, and containing piston 5, and having a valve chamber 6, connected to the usual auxiliary reservoir 7 and containing a main slide valve 8 and a graduating slide valve 9, adapted to be operated, through stem 10, by the piston 5.

The usual brake cylinder 11 is connected, through passage 12, with a passage 13, leading to the seat of slide valve 8, and a supplemental reservoir 14 is connected to a passage 15, which leads to the seat of slide valve 8.

The emergency valve device comprises a piston 16 contained in piston chamber 17 and a slide valve 18 and an auxiliary valve 19 contained in valve chamber 20 and adapted to be operated, through a stem 21 by piston 16. The valve chamber 20 is connected to a volume increasing or quick action chamber 22.

Figure 1:
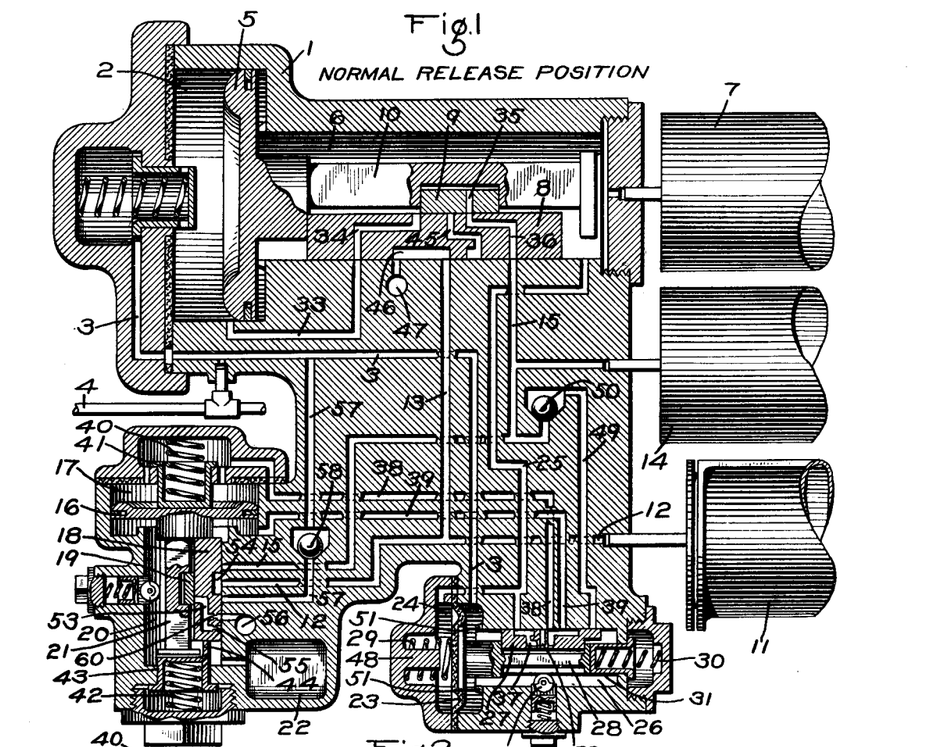
Fig. 1 is a diagrammatic sectional view of a triple valve device showing my improvements embodied therein, the several parts being shown in release position.

The pilot valve device comprises a flexible diaphragm 23, having the chamber 24 at one side connected, through a passage 25 with the valve chamber 6 and the auxiliary reservoir 7. The valve chamber 26 at the opposite side of the diaphragm, contains a slide valve 27 adapted to be operated, through a stem 28, by the diaphragm 23. A spring 29 in chamber 24 acts on the diaphragm 23, and a spring 30 acts through a sleeve 31, against the stem 28, and said springs tend to maintain the diaphragm 23 and the slide valve 27 in the normal position, as shown in Fig. 1. A spring-pressed roller 32 acts on the valve 27 and tends to maintain the valve seated. The valve chamber 26 is connected to brake pipe passage 3.

In operation, when the brake pipe 4 is supplied with fluid under pressure in the usual manner, fluid flows from the brake pipe to piston chamber 2 of the triple valve device, and with the triple valve parts in release position, as shown in Fig. 1, fluid flows from piston chamber 2, through passage 33 and port 34 in the main slide valve 8 to valve chamber 6, charging said chamber and the auxiliary reservoir 7 with fluid under pressure.

Fluid under pressure is then supplied through registering ports 35 and 36 in the graduating valve 9 and the main slide valve 8 to passage 15, charging the supplemental reservoir 14.

Fluid at auxiliary reservoir pressure is supplied through passage 25 to diaphragm chamber 24, while valve chamber 26 is connected to brake pipe passage 3, so that when the auxiliary reservoir pressure has been increased to substantially brake pipe pressure, the diaphragm 23 and the valve 27 will be maintained in the normal position, as shown in Fig. 1, by the springs 29 and 30.

In the normal position of slide valve 27, a cavity 37 connects passage 38, leading to piston chamber 17 with passage 39, leading to valve chamber 20 and cavity 37 also communicates with passage 25. Consequently, the fluid pressures are built up on opposite sides of the emergency piston 16 at the pressure in the auxiliary reservoir.

A spring 40 acts through sleeve 41 on piston 16, while a spring 42 acts, through a sleeve 43 and the slide valve 18, on piston stem 21, so that with the fluid pressure equalized on opposite sides of piston 16, said piston will be maintained in the release position, as shown in Fig. 1. The sleeve 43 is provided with a member 44 which engages the slide valve 18 and operates to move the slide valve 18 from an inner position to the position shown in Fig. 1.

The apparatus being charged with fluid under pressure as hereinbefore described, a service application may be effected in the usual manner by causing a gradual reduction in brake pipe pressure.

The triple valve piston 5 then moves out to service application position, first moving the graduating valve 9 to blank the feed port 34, and the feed port 36, and causing the port 35 to register with port 45. The main slide valve 8 is then shifted to service position, first cutting off communication from brake cylinder passage 13, through cavity 46 to atmospheric exhaust port 47, and then causing the service port 45 to register with passage 13. Fluid under pressure is then supplied from the auxiliary reservoir 7 to the brake cylinder 11 to effect a service application of the brakes.

Upon effecting a service reduction in brake pipe pressure, a corresponding reduction is effected in the valve chamber 26 of the pilot valve device, but the pressure of the spring 30, applied to the end of the diaphragm stem 28 through the medium of the sleeve 31, is sufficient to prevent auxiliary reservoir pressure present in diaphragm chamber 24 from causing the flexing of the diaphragm from its normal position as shown in Fig. 1, and consequently the diaphragm stem 28 and slide valve will be maintained in their normal positions. With the pilot valve device thus maintained inactive, it follows that the emergency valve device will remain inactive, in other words when a service reduction in brake pipe pressure is effected, both the pilot valve device and the emergency valve device remain in their normal positions as shown in Fig. 1.

When it is desired to release the brakes after a service application, the brake pipe pressure is increased in the usual manner, causing the triple valve piston 5 to move toward the right hand to its normal release position, first moving the graduating valve 9 to cause the port 35 to register with the port 36 in the main slide valve 8 and then shifting the main slide valve and graduating slide valve to their normal release positions. With the triple valve device in normal release position, fluid under pressures released from the brake cylinder 11 to the atmosphere by way of passages 12 and 13, cavity 46 in the main slide valve 8 and exhaust port 47, and the remainder of the equipment is recharged in substantially the same manner as has been before described.

Figure 2:
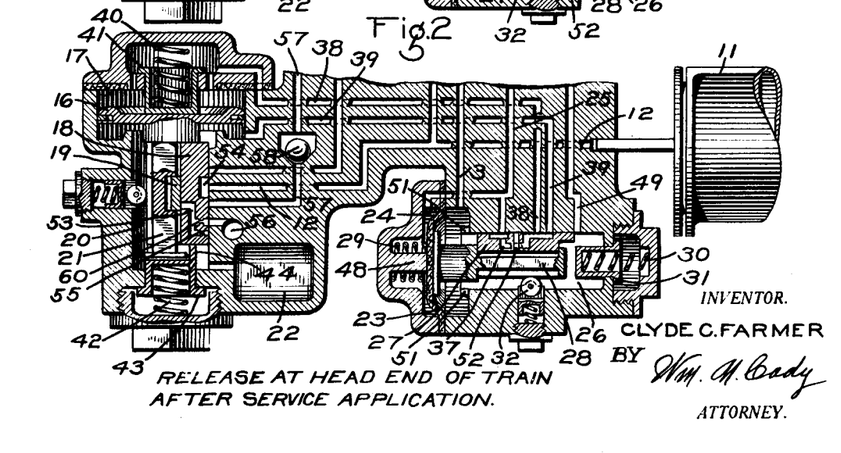
Fig. 2 is a like sectional view of a portion of the device but showing the several parts in the positions they assume in releasing the brakes after a service application.

It is well known that, in charging the fluid pressure equipment on a train, the brake pipe pressure in the equipment on the cars at the head end of the train is temporarily increased above the standard pressure carried in the brake pipe. On the cars where this temporary increase occurs, brake pipe pressure supplied to the valve chambers 26 of the pilot valve devices, will cause the diaphragms 23 to be flexed toward the left hand to their extreme positions against stops 48 as shown in Fig. 2, which stops are carried by the casings. As the diaphragms 23 are thus flexed they cause their respective stems 28 and slide valves 37 carried by the stems to move to their extreme left hand positions, the slide valves uncovering passages 49 so that fluid under pressure is now supplied from the supplemental reservoirs to the brake pipe by way of passages 15, past ball check valves 50, passages 49, valve chambers 26 in the pilot valve devices and passages 3, thus assisting in the rapid build up in brake pipe pressure throughout the train.

Now, when auxiliary reservoir and brake pipe pressures in the chambers 24 and 26 of each of the pilot valves which has been moved to the position in which the supplemental reservoir is connected to the brake pipe, are substantially equal, the pressure of the spring 29 causes the diaphragm to flex toward the right hand, shifting the stem 28 and slide valve 27 to their normal position, the free end of the stem stopping against the spring-pressed sleeve 31.

When an emergency reduction in brake pipe pressure is effected, the triple valve piston 5, graduating slide valve 9 and main slide valve move to their extreme left hand position and fluid under pressure is supplied from the auxiliary reservoir 7 to the brake cylinder 11 in the same manner as has been described in connection with the effecting of a service application of the brakes.

Further, when an emergency reduction in brake pipe pressure is effected, the pressure of fluid in the diaphragm 24 of the pilot valve device, as supplied from the auxiliary reservoir, causes the diaphragm 23 to flex toward the right hand, shifting the diaphragm stem 28 and slide valve in the same direction against the opposing pressure of the spring-pressed sleeve 31, movement of the diaphragm, stem and slide valve being limited by the stem abutting against stops 51 carried by the casing.

Figure 3:
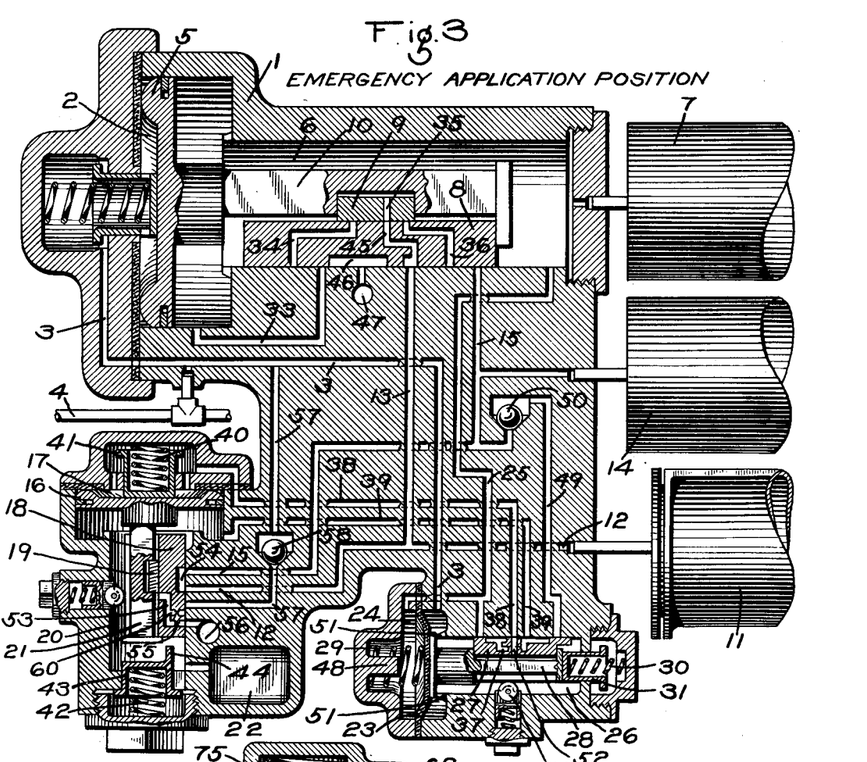
Fig. 3 is a view similar to Fig. 1 but showing the several parts in the positions they assume in effecting an emergency application of the brakes.

With the slide valve 27 in its extreme right hand position, as shown in Fig. 3, communication between the passage 25 leading from the auxiliary reservoir 7 by way of valve chamber 6 of the triple valve device, and the passages 38 and 39 leading to the chambers 17 and 20 respectively, in the emergency valve device, as well as communication between the passages 38 and 39, are closed off and a port 52 in the slide valve 27 registers with passage 38, which port due to such registration, connects the emergency piston chamber 17 to the brake pipe 4 by way of the valve chamber 26 in the pilot valve device and passage 3.

With the emergency piston chamber 17 thus connected to the brake pipe, the emergency reduction in brake pipe pressure is also effective in this chamber, so that the pressure of fluid in the emergency valve chamber 20 and from the volume increasing chamber 22 causes the emergency piston 16 to move to its extreme upper position as shown in Fig. 3. As the piston is thus moved it first shifts the auxiliary slide valve relative to the slide valve 18 to uncover a port 53 in the slide valve 18 and then shifts the main slide valve to its uppermost or emergency position, as shown in Fig. 3. Fluid under pressure is now supplied from the supplemental reservoir 7 to the brake cylinder 11 through passage 15, a cavity 54 and brake cylinder passage 12 and augments brake cylinder pressure.

Further, with the slide valve 18 in emergency position, a restricted branch 55 of the port 53 registers with an exhaust passage 56 in the casing, so that fluid under pressure from the valve chamber 20 and chamber 22 is discharged to the atmosphere through the port 53, branch 55 and passage 56 at a restricted rate. Now when the pressure of fluid in the emergency valve chamber is reduced slightly below the pressure of the spring 40, the emergency piston 16 is caused to move downwardly until such movement is arrested by the slide valve 18 stopping against the member 44 on the spring-pressed sleeve 43 at which time the piston and slide valves are in their normal positions, as shown in Fig. 1 and will be maintained in this position until a release of the brakes is initiated. When the slide valve 18 is thus returned to its normal position, it closes off communication from the supplemental reservoir 14 to the brake cylinder. It will here be noted that the branch 55 of the port 53 so restricts the rate of flow of fluid from the emergency valve chamber 20 that the emergency piston will remain in its emergency position until after the pressure of fluid in the supplemental reservoir has equalized into the brake cylinder.

When it is desired to release the brakes after an emergency application, the brake pipe pressure is increased in the usual manner, causing the several parts of the triple valve device to move to their normal release positions.

Figure 4:
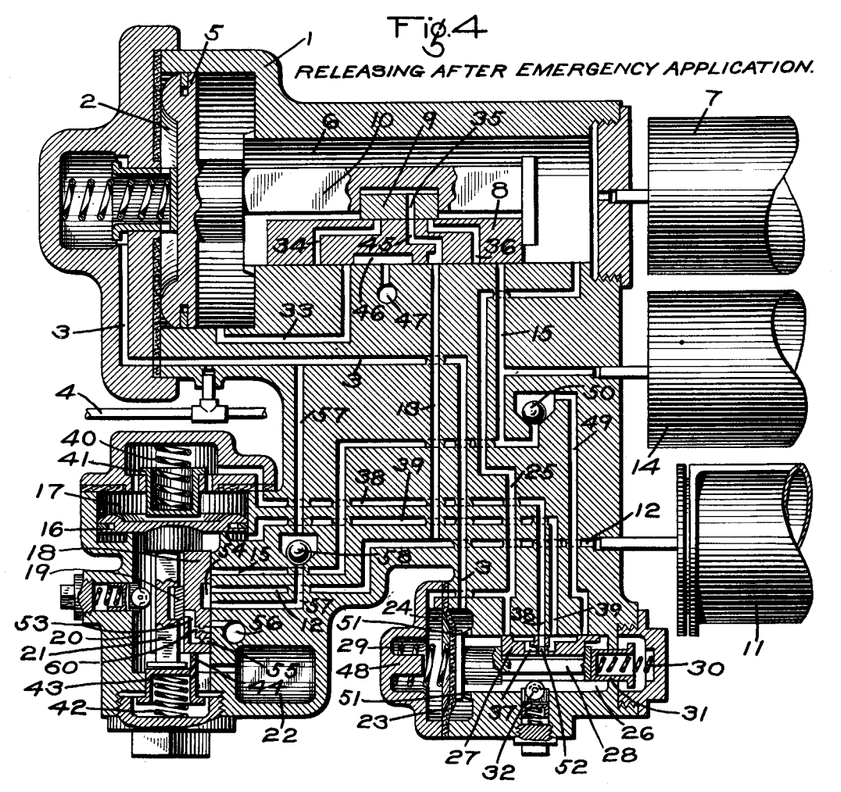
Fig. 4 is a like view but showing the several parts in the positions they assume in effecting the release of the brakes after an emergency application.

Fluid under pressure supplied to the brake pipe flows to the emergency piston chamber 17 through passage 3, valve chamber 26 in the pilot valve device, port 52 in the slide valve 27 and passage 38, causing the emergency piston 16 and slide valves 18 and 19 to move downwardly from their normal positions, as shown in Fig. 1 against the opposing pressure of the spring-pressed sleeve 43 acting through the medium of the slide valve 18 and sleeve member 44, to their lowermost or overtravel positions, as shown in Fig. 4. With the slide valve 18 in this position, the cavity 54 connects the brake cylinder passage 12 to a passage 57 leading to the passage 3, which is connected to the brake pipe 4, so that fluid under pressure now flows from the brake cylinder to the brake pipe, thus increasing the rate of build up in brake pipe pressure, facilitating the prompt release of the brakes throughout the length of the train.

Interposed in the passage 57 is a ball check valve 58 which is adapted to prevent back flow of fluid under pressure from the passage 3 to the seat of the emergency slide valve.

When brake pipe pressure in the valve chamber 26 of the pilot valve device is substantially equal to auxiliary reservoir pressure present in chamber 24, the pressure of the spring-pressed sleeve 31 on the diaphragm stem 28 causes the stem, slide valve 27 carried thereby, and diaphragm 23 to again assume their normal positions. With the slide valve 27 in its normal position, the passages 25, 38 and 39 are connected together, so that fluid under pressure is again supplied from the auxiliary reservoir passage 25 to the emergency piston chamber 17 and valve chamber 20 and volume increasing chamber 22. The pressures in both of these chambers now being substantially equal, the emergency piston will be balanced so that the pressure of the spring-pressed sleeve 43 causes the emergency piston and slide valves 18 and 19 to move upwardly to their normal positions as shown in Fig. 1, closing off communication from the brake cylinder to the brake pipe.

If an over reduction of, for instance five pounds, should be effected, the several parts of the pilot valve device will be shifted to their extreme right hand positions and connect the emergency piston chamber 17 to the brake pipe, but if the rate of reduction does not exceed a service rate, the emergency piston will move upwardly until the auxiliary slide valve uncovers the port 53 in the slide valve 18. When the port 53 is thus uncovered, the pressure of fluid in the valve chamber 20 reduces to the atmosphere by way of port 53, a restricted branch passage 60 and exhaust passage 56 at substantially the same rate as the brake pipe is reducing. Due to the fact that both brake pipe pressure and the pressure of the chamber 20 are reducing at substantially the same rate, the upward travel of the emergency piston 16 will cease before the piston stem can move the slide valve 18 from its normal position, thus effectively preventing unintentional operation of the emergency valve device to emergency position. When the pressures of fluid in the valve chamber 20 and the piston chamber 17 are substantially equal, the pressure of the spring-pressed sleeve 41 causes the piston 16 and slide valve 19 to return to their normal positions in which the port 53 is again covered by the auxiliary slide valve 19.

Figure 5:
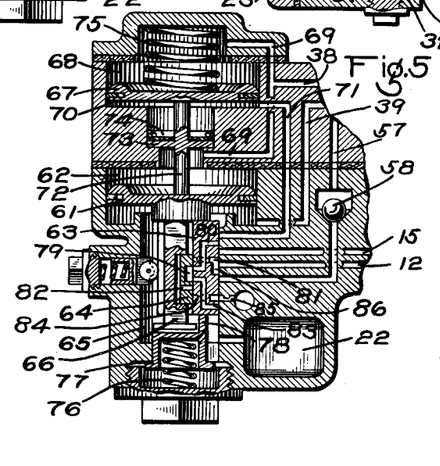
Fig. 5 is a fragmentary diagrammatic view of a portion of the device illustrating a modification of the emergency valve mechanism, the several parts of the mechanism being shown in their normal positions.

It will be noted from the foregoing description that the several parts of the emergency valve device shown in Figs. 1 to 4 inclusive are moved to emergency positions when a reduction in brake pipe pressure is effected at an emergency rate and remain in such positions until after the supplemental reservoir 14 equalizes into the brake cylinder and then move downwardly to their normal positions in which communication between the reservoir and brake cylinder is closed off, but in some cases it may be desired to maintain the reservoir 14 connected to the brake cylinder until such time as the release of the brakes is initiated, and to accomplish this, I have provided a modified emergency valve device as shown in Fig. 5.

The emergency valve device shown in Fig. 5 may comprise a piston 61 contained in a piston chamber 62, and a slide valve 63 and an auxiliary slide valve 64 contained in a valve chamber 65 and adapted to be operated through the medium of a stem 66 by piston 61. The valve chamber 65 is connected to the volume increasing chamber 22 and to the passage 39 leading to the pilot valve device.

This emergency valve device may also comprise a piston 67 contained in a piston chamber 68 which is connected to the piston chamber 62 through a passage 69, said passage being connected to the passage 38 leading to the pilot valve device. The chamber 70 at the other side of the piston 67 is connected to a passage 71 leading to the seat for the slide valve 18. The piston 67 is provided with a stem 72 which is adapted to engage with the piston 61 and is provided with an enlargement 73 which is contained in the chamber 70 and carries a packing 74 for preventing leakage of fluid under pressure from the chamber 70 to the chamber 62.

It will here be understood that with the exception of the emergency valve device, the rest of the equipment is the same as that shown in Figs. 1 to 4.

In operation, when the brake pipe is supplied with fluid under pressure in the usual manner, fluid is supplied to the passages 38 and 39 leading to the emergency valve device in the same manner as described in connection with the equipment shown in Figs. 1 to 4 inclusive. Fluid supplied to the passage 38 flowing to the piston chambers 62 and 68 by way of passage 69 and fluid supplied to the passage 38 flowing directly into the emergency valve chamber 65 and from thence to the chamber 22.

A spring 75 contained in the piston chamber 68 acts through the medium of the piston 67 and piston stem 72 on the piston 61, while a spring 76 acts on the piston stem 66 through the medium of a sleeve 77, a member 78 carried by the member and the slide valve 63, so that with the fluid pressures equalized on both sides of piston 61 and on the upper side of the piston 67, the pistons 61 and 67 will be maintained in their normal positions as shown in Fig. 5.

Now when an emergency reduction in brake pipe pressure is effected, the pilot valve device will be caused to function to connect the passage 38 to the brake pipe in the same manner as described in connection with Figs. 1 to 4, so that a corresponding reduction in the pressures of fluid in the piston chambers 62 and 68 of the emergency valve device is effected.

The pressure of fluid in valve chamber 65 now causes the piston 61 to move to its uppermost or emergency position, actuating the piston 67 to its uppermost position against the opposing pressure of the spring 75. The piston 61 in its travel to emergency position first moves the auxiliary slide valve 64 relative to the slide valve 63 so that a cavity 79 in the auxiliary slide valve connects ports 80 and 81 in the slide valve 63 and a port 82 in the auxiliary slide valve 64 registers with a port 83 in the slide valve 63. The main slide valve is then shifted to emergency position, cutting off the flow of fluid from the valve chamber 65 by way of a port 84 in the slide valve 63 and a restricted passage 85 leading to the atmosphere, which port was uncovered by the auxiliary slide valve 64 in its initial movement.

With the slide valve 63 in emergency position, the port 80 registers with the passage 71 and a foot extension 86 of the port 81 connects the passage 15 to the brake cylinder passage 12. Fluid under pressure now flows from the supplemental reservoir 14 to the brake cylinder by way of passage 15, foot extension 86 and brake cylinder passage 12. From the passage 15 fluid also flows to the chamber 70 at one side of the piston 67 through the port 81 in the slide valve 63, cavity 79 in the auxiliary slide valve 64, port 80 in the slide valve 63 and passage 71, thus charging the chamber 70 with fluid at supplemental reservoir pressure. The pressure of fluid in this chamber 70 now maintains the piston 67 and its stem 72 in their uppermost positions against the pressure of the spring 75.

Further, with the slide valve 63 in emergency position, the port 83 in this slide valve registers with the exhaust passage 85 and since the port 82 in the auxiliary slide valve 64 is also in registration with the port 83, fluid under pressure in the valve chamber 65 and volume chamber 22 is discharged to the atmosphere.

With the chambers 62, 65 and 22 thus vented and the piston 67 maintained in its uppermost position by fluid under pressure, the emergency piston 61 and slide valves 63 and 64 will remain in emergency positions due to the frictional resistance offered the several moving parts.

Now when fluid under pressure is supplied to the brake pipe to release the brakes, fluid flows from the brake pipe to the piston chambers 62 and 68 by way of passage 3, valve chamber 26 in the pilot valve device, port 52 in the slide valve 27, passage 38 and passage 69, causing the emergency piston to move downwardly to its over travel position against the pressure of the spring-pressed sleeve 77. The initial movement of the piston, causing the auxiliary slide valve 64 to move relative to the slide valve 63, so that the cavity 79 connects the ports 80 and 83 in the slide valve 63 and since these ports are in registration with the passages 71 and 85, fluid under pressure in the chamber 70 is vented to the atmosphere and the piston 67 is caused to move downwardly to its normal position as shown in Fig. 5. With the slide valve 63 in its lowermost or over travel position, the foot extension 86 of the port 81 connects the passages 12 and 15, so that fluid under pressure is supplied from the brake cylinder to the brake pipe.

In releasing the brakes, when the several parts of the pilot valve device are shifted to their normal positions, fluid at auxiliary reservoir pressure is again supplied to both sides of the piston 61, and the pressure of the spring 76 acting through the medium of the sleeve 77, member 78, and slide valve 63 causes the several parts of the emergency valve device to assume their normal positions as shown in Fig. 5.

When an over reduction in brake pipe pressure is effected at a service rate, the piston 61 will move upwardly, shifting the slide valve 64 relative to the slide valve 63 so as to uncover the port 84 in the slide valve 63. With the slide valve 63 in its normal position, the port 84 registers with the passage 85, so that when this passage is uncovered by the auxiliary slide valve 63, fluid flows from the chamber 65 and 22 to the atmosphere at substantially the same rate as fluid is being vented from the brake pipe and due to this, the upward travel of the piston 61 will cease before the slide valve 63 can be moved from its normal position, thus preventing an emergency application of the brakes.

From the foregoing description, it will be noted that the pilot valve device not only controls the operation of the emergency valve device but also maintains the quick action chamber 22 and auxiliary reservoir connected when the equipment is in release position, thus preventing the overcharge of the chamber 22. The pilot valve device also controls the back flow of fluid from the supplemental reservoir to the brake pipe in effecting a release of the brakes after a service application.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment, the combination with a brake pipe, an auxiliary reservoir normally charged with fluid under pressure from the brake pipe, and a triple valve device subject to variations in brake pipe pressure for effecting the application and release of the brakes, of an emergency valve device operative to effect an emergency application of the brakes and having a quick action chamber, and an auxiliary valve device normally connecting said auxiliary reservoir and chamber.

2. In a fluid pressure brake equipment, the combination with a brake pipe, and auxiliary reservoir normally charged with fluid under pressure from the brake pipe, and a triple valve device subject to variations in brake pipe pressure for effecting the application and release of the brakes, of an emergency valve device operative to effect an emergency application of the brakes and having a quick action chamber, and an auxiliary valve device normally connecting said auxiliary reservoir and chamber and operative upon a sudden reduction in brake pipe pressure for closing communication between the auxiliary reservoir and chamber.

3. In a fluid pressure brake equipment, the combination with a brake pipe, an auxiliary reservoir normally charged with fluid under pressure from the brake pipe, and a triple valve device subject to variations in brake pipe pressure for effecting the application and release of the brakes, of an emergency valve device operative to effect an emergency application of the brakes and having a quick action chamber, and an auxiliary valve device normally connecting said auxiliary reservoir and chamber and operative upon a sudden reduction in brake pipe pressure for closing communication between the auxiliary reservoir and chamber, and means for preventing the operation of said auxiliary valve device upon effecting a service reduction in brake pipe pressure.

4. In a fluid pressure brake equipment, the combination with a brake pipe, an auxiliary reservoir and a brake cylinder, of an emergency valve device comprising pressure sensitive means normally subject on both sides to auxiliary reservoir pressure and operative upon a sudden reduction in pressure on one side for establishing communication through which fluid under pressure is supplied to the brake cylinder to effect an emergency application of the brakes, and a valve device normally establishing communication through which fluid under pressure is supplied from the auxiliary reservoir to both sides of said pressure sensitive means and operative upon a sudden reduction in brake pipe pressure for effecting a sudden reduction in the pressure of fluid on one side of said pressure sensitive means.

5. In a fluid pressure brake equipment, the combination with a brake pipe, an auxiliary reservoir and a brake cylinder, of an emergency valve device comprising pressure sensitive means normally subject on both sides to auxiliary reservoir pressure and operative upon a sudden reduction in pressure on one side for establishing communication through which fluid under pressure is supplied to the brake cylinder to effect an emergency application of the brakes, and a valve device normally establishing communication through which fluid under pressure is supplied from the auxiliary reservoir to both sides of said pressure sensitive means and operative upon a sudden reduction in brake pipe pressure for connecting one side of said pressure sensitive means to the brake pipe to effect a sudden reduction in the pressure of fluid on the last mentioned side of said pressure sensitive means.

6. In a fluid pressure brake equipment, the combination with a brake pipe, an auxiliary reservoir and a brake cylinder, of an emergency valve device comprising pressure sensitive means normally subject on both sides to auxiliary reservoir pressure and operative upon a sudden reduction in pressure on one side for establishing communication through which fluid under pressure is supplied to the brake cylinder to effect an emergency application of the brakes, and a valve device normally establishing communication through which fluid under pressure is supplied from the auxiliary reservoir to both sides of said pressure sensitive means and operative upon a sudden reduction in brake pipe pressure for closing off communication between the auxiliary reservoir and both sides of said pressure sensitive means and for connecting one side of the pressure sensitive means to the brake pipe to effect a sudden reduction in the pressure of fluid on the last mentioned side of the pressure sensitive means.

7. In a fluid pressure brake equipment, the combination with a brake pipe, a brake cylinder, an auxiliary reservoir, and a triple valve device operated upon an emergency reduction in brake pipe pressure for supplying fluid under pressure from the auxiliary reservoir to the brake cylinder, of a supplemental reservoir, an emergency valve device normally subject to auxiliary reservoir pressure and operated upon an emergency reduction in brake pipe pressure for supplying fluid under pressure from said supplemental reservoir to the brake cylinder to effect an emergency application of the brakes, said emergency valve device being operated after an emergency application of the brakes to connect the brake cylinder with the brake pipe, so that fluid under pressure is supplied from the brake cylinder to the brake pipe to facilitate the release of the brakes, and valve means subject to the opposing pressures of the brake pipe and auxiliary reservoir for controlling the operation of said emergency valve device.

8. In a fluid pressure brake equipment, the combination with a brake pipe, a brake cylinder, an auxiliary reservoir, and a triple valve device operated upon an emergency reduction in brake pipe pressure for supplying fluid under pressure from the auxiliary reservoir to the brake cylinder, of a supplemental reservoir, an emergency valve device normally subject to auxiliary reservoir pressure and operated upon an emergency reduction in brake pipe pressure for supplying fluid under pressure from said supplemental reservoir to the brake cylinder to effect an emergency application of the brakes, said emergency valve device being operated after an emergency application of the brakes to connect the brake cylinder with the brake pipe, so that fluid under pressure is supplied from the brake cylinder to the brake pipe to facilitate the release of the brakes, and valve means subject to the opposing pressures of the brake pipe and auxiliary reservoir for controlling the operation of said emergency valve device, said valve means normally establishing communication through which the emergency valve device is subjected to the pressure of fluid from the auxiliary reservoir and operated upon a sudden reduction in brake pipe pressure to a position for effecting the operation of said emergency valve device to emergency position and for effecting the operation of the emergency valve device to connect the brake cylinder to the brake pipe upon the brake pipe pressure being increased after an emergency application of the brakes.

9. In a fluid pressure brake equipment, the combination with a brake pipe, a brake cylinder, an auxiliary reservoir, and a triple valve device operated upon an emergency reduction in brake pipe pressure for supplying fluid under pressure from the auxiliary reservoir to the brake cylinder, of a supplemental reservoir, an emergency valve device normally subject to auxiliary reservoir pressure and operated upon an emergency reduction in brake pipe pressure for supplying fluid under pressure from said supplemental reservoir to the brake cylinder to effect an emergency application of the brakes, said emergency valve device being operated after an emergency application of the brakes to connect the brake cylinder with the brake pipe, so that fluid under pressure is supplied from the brake cylinder to the brake pipe to facilitate the release of the brakes, and valve means subject to the opposing pressures of the brake pipe and auxiliary reservoir for controlling the operation of said emergency valve device, said valve means normally establishing communication through which the emergency valve device is subjected to the pressure of fluid from the auxiliary reservoir and operated upon a sudden reduction in brake pipe pressure to a position for effecting the operation of said emergency valve device to emergency position and for effecting the operation of the emergency valve device to connect the brake cylinder to the brake pipe upon the brake pipe pressure being increased after an emergency application of the brakes and further operated upon the substantial equalization of brake pipe and auxiliary reservoir pressures for again subjecting the emergency valve device to auxiliary reservoir pressure to permit said emergency valve device to be operated to its normal position.

10. In a fluid pressure brake equipment, the combination with a brake pipe, an auxiliary reservoir and a brake cylinder, of an emergency valve device comprising pressure sensitive means normally subject on both sides to auxiliary reservoir pressure and operative upon a sudden reduction in pressure on one side for establishing communication through which fluid under pressure is supplied to the brake cylinder to effect an emergency application of the brakes, a valve device normally establishing communication through which fluid under pressure is supplied from the auxiliary reservoir to both sides of said pressure sensitive means and operative upon effecting an emergency reduction in brake pipe pressure for effecting a sudden reduction in the pressure of fluid on one side of the pressure sensitive means, and means for preventing the operation of said valve device upon effecting a service reduction in brake pipe pressure.

11. In a fluid pressure brake equipment, the combination with a brake pipe, an auxiliary reservoir, a supplemental reservoir and a brake cylinder, of an emergency valve device comprising pressure sensitive valve means normally subject on both sides to auxiliary reservoir pressure and operative upon a sudden reduction on one side for establishing communication through which fluid under pressure is supplied from said supplemental reservoir to said brake cylinder to effect an emergency application of the brakes, a valve device operative upon a sudden reduction in brake pipe pressure for effecting a sudden reduction in the pressure of fluid on said side of the pressure sensitive means, and means included in said emergency valve device operative to maintain the pressure of fluid on the other side of said pressure sensitive means sufficient to maintain the pressure sensitive means in emergency position until the supplemental and brake cylinder pressures equalize.

12. In a fluid pressure brake equipment, the combination with a brake pipe, an auxiliary reservoir, a supplemental reservoir and a brake cylinder, of an emergency valve device comprising pressure sensitive valve means normally subject on both sides to auxiliary reservoir pressure and operative upon a sudden reduction on one side for establishing communication through which fluid under pressure is supplied from said supplemental reservoir to said brake cylinder to effect an emergency application of the brakes, a valve device operative upon a sudden reduction in brake pipe pressure for effecting a sudden reduction in the pressure of fluid on said side of the pressure sensitive means, and means included in said emergency valve device operative to maintain the pressure sensitive means in emergency position to permit the pressures of fluid in said supplemental reservoir and brake cylinder to equalize.

13. In a fluid pressure brake equipment, the combination with a brake pipe, an auxiliary reservoir, a supplemental reservoir and a brake cylinder, of an emergency valve device comprising pressure sensitive valve means normally subject on both sides to auxiliary reservoir pressure and operative upon a sudden reduction on one side for establishing communication through which fluid under pressure is supplied from said supplemental reservoir to said brake cylinder to effect an emergency application of the brakes, a valve device operative upon a sudden reduction in brake pipe pressure for effecting a sudden reduction in the pressure of fluid on said side of the pressure sensitive means, and means included in said emergency valve device operative to reduce the pressure of fluid under pressure on the other side of the pressure sensitive means to permit the pressure sensitive means to return from emergency position to normal position after a predetermined period of time.

14. In a fluid pressure brake equipment, the combination with a brake pipe, an auxiliary reservoir, a supplemental reservoir and a brake cylinder, of an emergency valve device comprising pressure sensitive valve means normally subject on both sides to auxiliary reservoir pressure and operative upon a sudden reduction on one side for establishing communication through which fluid under pressure is supplied from said supplemental reservoir to said brake cylinder to effect an emergency application of the brakes, a valve device operative upon a sudden reduction in brake pipe pressure for effecting a sudden reduction in the pressure of fluid on said side of the pressure sensitive means, and means for preventing said valve device from operating from its normal position in effecting a service reduction in brake pipe pressure, and operative upon an increase in brake pipe pressure to connect the supplemental reservoir to the brake pipe so that fluid under pressure is supplied from the supplemental reservoir to the brake pipe to facilitate the release of the brakes.

15. In a fluid pressure brake equipment, the combination with a brake pipe and an auxiliary reservoir charged with fluid under pressure from the brake pipe, of a chamber normally charged with fluid under pressure, an emergency valve device normally subject to auxiliary reservoir pressure and being adapted to be subjected to the opposing pressures of the brake pipe and said chamber to effect an emergency application of the brakes, and means operative upon a sudden reduction in brake pipe pressure for controlling the operation of said emergency valve device to effect an emergency application of the brakes.

16. In a fluid pressure brake equipment, the combination with a brake pipe and an auxiliary reservoir charged with fluid under pressure from the brake pipe, of a chamber normally charged with fluid under pressure, an emergency valve device normally subject to auxiliary reservoir pressure and being adapted to be subjected to the opposing pressures of the brake pipe and said chamber to effect an emergency application of the brakes, and valve means subject to the opposing pressures of the auxiliary reservoir and brake pipe for controlling the operation of said emergency valve device to effect an emergency application of the brakes.

17. In a fluid pressure brake equipment, the combination with a brake pipe and an auxiliary reservoir charged with fluid under pressure from the brake pipe, of a chamber normally charged with fluid under pressure from the auxiliary reservoir, an emergency valve device normally subject to auxiliary reservoir pressure and being adapted to be subjected to the opposing pressures of the brake pipe and said chamber to effect an emergency application of the brakes, and means operative upon a sudden reduction in brake pipe pressure for controlling the operation of said emergency valve device to effect an emergency application of the brakes.

18. In a fluid pressure brake equipment, the combination with a brake pipe and an auxiliary reservoir charged with fluid under pressure from the brake pipe, of a chamber normally charged with fluid under pressure, an emergency valve device normally subject to auxiliary reservoir pressure and being adapted to be subjected to the opposing pressures of the brake pipe and said chamber to effect an emergency application of the brakes, and valve means normally establishing communication through which fluid under pressure is supplied from said auxiliary reservoir to said chamber and emergency valve device and operative upon a sudden reduction in brake pipe pressure for controlling the operation of said emergency valve device to effect an emergency application of the brakes.

19. In a fluid pressure brake equipment, the combination with a brake pipe and an auxiliary reservoir charged with fluid under pressure from the brake pipe, of a chamber normally charged with fluid under pressure, an emergency valve device comprising pressure sensitive means normally subject on both sides to auxiliary reservoir pressure and subject on one side to the pressure of fluid in said chamber upon effecting a sudden reduction in the pressure of fluid on the other side to effect an emergency application of the brakes, and valve means normally establishing communication through which fluid under pressure is supplied from the auxiliary reservoir to both sides of the pressure sensitive means and to said chamber and operative upon a sudden reduction in brake pipe pressure for effecting a sudden reduction in the pressure of fluid on said other side of the pressure sensitive means.

20. In a fluid pressure brake equipment, the combination with a brake pipe and an auxiliary reservoir charged with fluid under pressure from the brake pipe, of a chamber normally charged with fluid under pressure, an emergency valve device comprising pressure sensitive means normally subject on both sides to auxiliary reservoir pressure and subject on one side to the pressure of fluid in said chamber upon effecting a sudden reduction in the pressure of fluid on the other side to effect an emergency application of the brakes, and valve means normally establishing communication through which fluid under pressure is supplied from the auxiliary reservoir to both sides of the pressure sensitive means and to said chamber and operative upon a sudden reduction in brake pipe pressure for establishing communication through which the pressure of fluid on said other side of the pressure sensitive means is reduced with the pressure of fluid in the brake pipe.

21. In a fluid pressure brake equipment, the combination with a brake pipe and an auxiliary reservoir charged with fluid under pressure from the brake pipe, of a chamber normally charged with fluid under pressure, an emergency valve device comprising pressure sensitive means normally subject on both sides to auxiliary reservoir pressure and subject on one side to the pressure of fluid in said chamber upon effecting a sudden reduction in the pressure of fluid on the other side to effect an emergency application of the brakes, and valve means normally establishing communication through which fluid under pressure is supplied from the auxiliary reservoir to both sides of the pressure sensitive means and to said chamber and operative upon a sudden reduction in brake pipe pressure for closing communication from the auxiliary reservoir to both sides of the pressure sensitive means and for establishing communication through which the pressure of fluid on said other side of the pressure sensitive means is suddenly reduced with the pressure of fluid in the brake pipe.

22. In a fluid pressure brake equipment, the combination with a brake pipe and an auxiliary reservoir charged with fluid under pressure from the brake pipe, of a chamber normally charged with fluid under pressure, an emergency valve device comprising pressure sensitive means normally subject on both sides to auxiliary reservoir pressure and subject on one side to the pressure of fluid in said chamber upon effecting a sudden reduction in the pressure of fluid on the other side to effect an emergency application of the brakes, valve means normally establishing communication through which fluid under pressure is supplied from the auxiliary reservoir to both sides of the pressure sensitive means and to said chamber and operative upon a sudden reduction in brake pipe pressure for closing communication from the auxiliary reservoir to both sides of the pressure sensitive means and chamber and for establishing communication through which the pressure of fluid on said other side of the pressure sensitive means is suddenly reduced with the pressure of fluid in the brake pipe, and means for gradually reducing the pressure of fluid in said chamber while the pressure sensitive means are in emergency position to permit the pressure sensitive means to be returned to normal position after a predetermined period of time has elapsed.

23. In a fluid pressure brake equipment, the combination with a brake pipe and an auxiliary reservoir charged with fluid under pressure from the brake pipe, of a chamber normally charged with fluid under pressure, an emergency valve device comprising pressure sensitive means normally subject on both sides to auxiliary reservoir pressure and subject on one side to the pressure of fluid in said chamber upon effecting a sudden reduction in the pressure of fluid on the other side to effect an emergency application of the brakes, valve means normally establishing communication through which fluid under pressure is supplied from the auxiliary reservoir to both sides of the pressure sensitive means and to said chamber and operative upon either a sudden reduction in brake pipe pressure or an over reduction in brake pipe pressure for closing communication from the auxiliary reservoir to both sides of said pressure sensitive means and chamber and for connecting said other side of the pressure sensitive means to the brake pipe, and means included in said emergency valve device for reducing the pressure of fluid at a rate corresponding to the rate of brake pipe reduction in effecting an over reduction in brake pipe pressure to prevent the pressure sensitive means from operating to emergency position.

24. In a fluid pressure brake equipment, the combination with an emergency valve device normally subject on opposite sides to fluid under pressure and operated upon a reduction in fluid pressure on one side to effect an emergency application of the brakes, of an auxiliary valve device operated upon a sudden reduction in brake pipe pressure to connect said side of the emergency valve device with the brake pipe to effect a reduction in fluid pressure on said side of the emergency valve device.

25. In a fluid pressure brake equipment, the combination with an emergency valve device normally subject on opposite sides to fluid under pressure and operated upon a reduction in fluid pressure on one side to effect an emergency application of the brakes, of an auxiliary valve device operated upon a sudden reduction in brake pipe pressure to connect said side of the emergency valve device with the brake pipe to effect a reduction in fluid presure on said side of the emergency valve device, and means for preventing the operation of said auxiliary valve device upon effecting a reduction in brake pipe pressure at a service rate.

26. In a fluid pressure brake equipment, the combination with a brake pipe, of an emergency valve device operated upon a sudden reduction in brake pipe pressure to effect an emergency application of the brakes, yielding means opposing the movement of the emergency valve device to emergency position, and means operative in the emergency position of the emergency valve device for subjecting one side of said yielding means to fluid under pressure to relieve the emergency valve device of the opposing force of said yielding means.

27. In a fluid pressure brake equipment, the combination with a brake pipe, of an emergency valve device having a normal position and an emergency position, said emergency valve device being movable to emergency position upon effecting a sudden reduction in brake pipe pressure and movable from emergency position to its normal position upon effecting an increase in brake pipe pressure, yieldable means opposing the movement of the emergency valve device to emergency position, means operative in the emergency position of the emergency valve device for supplying fluid under pressure to one side of said yielding means to relieve the emergency valve of the force of the yielding means, and means operative as said emergency valve is moved toward normal position for venting fluid under pressure from said yielding means to permit the return of the yielding means to normal position.

In testimony whereof I have hereunto set my hand, this 2nd day of December, 1930.

CLYDE C. FARMER.